Aug. 27, 1963     W. RIDDELL     3,102,177
ELECTRICAL SWITCHES
Filed Aug. 1, 1960     4 Sheets-Sheet 1

Aug. 27, 1963 W. RIDDELL 3,102,177
ELECTRICAL SWITCHES
Filed Aug. 1, 1960 4 Sheets-Sheet 3
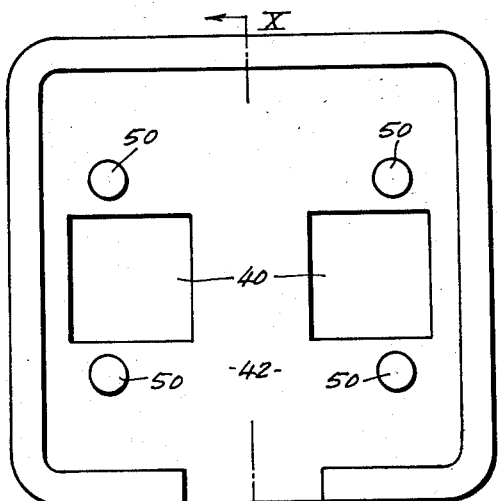
Fig. 10.
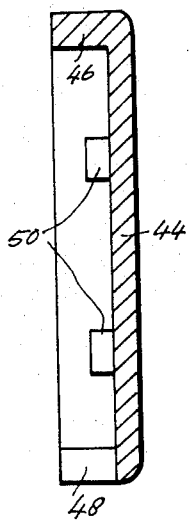
Fig. 9.
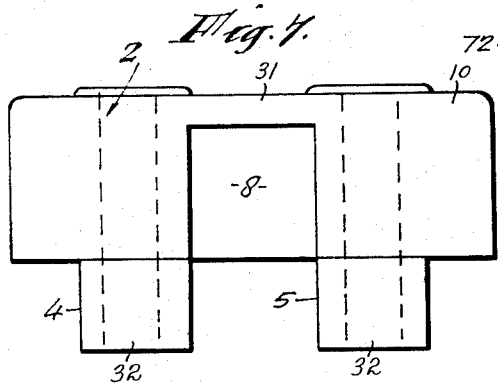
Fig. 7.
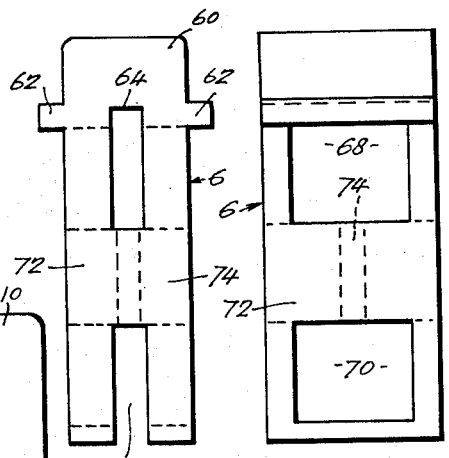
Fig. 11.    Fig. 12.
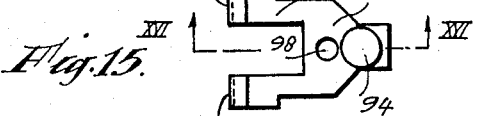
Fig. 15.
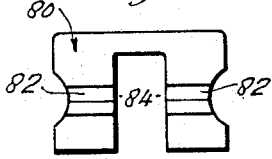
Fig. 14.
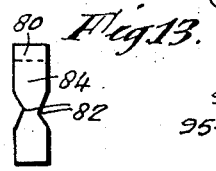
Fig. 13.
Fig. 16.

Aug. 27, 1963  W. RIDDELL  3,102,177
ELECTRICAL SWITCHES
Filed Aug. 1, 1960  4 Sheets-Sheet 4 under Aug. 27, 1963

3,102,177
ELECTRICAL SWITCHES
William Riddell, Whitley Bay, Northumberland, England, assignor to Burgess Products Company Limited, Hinckley, England
Filed Aug. 1, 1960, Ser. No. 46,705
Claims priority, application Great Britain Aug. 28, 1959
13 Claims. (Cl. 200—67)

This invention relates to a switch having ganged snap action mechanisms, each mechanism being of the kind (hereinafter referred to as a "snap action mechanism of the kind described") in which at least one spring actuated movably mounted contact arm is associated to make contact with a fixed contact, said spring and arm being relatively displaceable by an actuator through an aligned position, whereby a snap action of the contact arm is caused. Said contact carrying arms are usually relatively rigid and pivoted, but they may be constructed of resilient material which allows the contact end of the arm to move relatively to the contacts about an imaginary axis when flexed and reference herein to pivoted arms and pivots shall be deemed to include such constructions.

One way to obtain a four circuit switch is to gang together two two-circuit mechanisms. If such an assembly is perfectly symmetrical then, theoretically, the switch will be bi-stable and all the contacts will change over simultaneously. In practice, however, absolute symmetry is unobtainable due to manufacturing tolerances, though it can be closely approached, with the result that though each mechanism is itself truly bi-stable the combined assembly is not necessarily so. A truly bi-stable switch in the sense in which the term is here used means that the pivoted contact carrying arms, of which there would be two in each mechanism, are either all at one or the other extreme position and no other stable position is possible. It can well be appreciated that with a ganged switch failure to achieve with certainty positions wherein all four arms have the same attitude and move substantially simultaneously could result in wrong circuit connections and incorrect and possibly dangerous actuation of the mechanism with which the switch is associated.

According to the present invention there is provided the method of ganging together snap action mechanisms of the kind described which consists in providing a deliberate asymmetrical arrangement of the mounting points and fixed contact of at least two of the mechanisms. Also according to the present invention there is provided a switch having snap action mechanisms of the kind described which are ganged together, wherein at least one of the mechanisms is arranged with its mounting point and fixed contact deliberately out of symmetry as regards the remaining mechanisms.

According to one embodiment of the invention in which coil springs are used to produce the snap action and a spacer is provided between said springs intermediate of their ends, said spacer is unidirectional and such that, after allowing for manufacturing tolerances, the distance between the axes of the coil springs at said intermediate point is also greater or less than the distance between the pivots when the distance between the pivots is greater or less than the distance between the fixed contacts respectively. The amount by which such distances are greater or less may be the same or different provided always that the said amount is not excessive so as to render the mechanism inoperative.

As already stated, perfect symmetry cannot be achieved in practice, but deliberate asymmetry can be achieved by making such asymmetry exceed the aggregate error possible through manufacturing tolerances and the invention consists in the appreciation of this fact and in the use of an asymmetric construction to achieve a bi-stable switch.

Each snap action mechanism may be considered as consisting of a lever system combined with a spring system and accordingly a four circuit switch consists of a lever arrangement composed of four levers pivoted to a common actuating member and a spring arrangement consisting of two or more springs and a suitable linkage.

The use of asymmetry will be understood by reference to the diagrams and drawings filed herewith wherein:

FIG. 7 is a side elevation of the body shown in FIG. 6;

FIG. 9 is an underneath plan view of the lid moulding for the body shown in FIG. 5;

FIG. 10 is a section on the line X—X of FIG. 9;

FIG. 11 is a front elevation of the operating plunger shown in FIG. 5;

FIG. 12 is a side elevation of the operating plunger shown in FIG. 11;

FIG. 13 is a side elevation of one of the two anchors seen in FIG. 5;

FIG. 14 is a front elevation of the anchor shown in FIG. 13;

FIG. 15 is a plan view of the moving contact shown in FIG. 5;

FIG. 16 is a section on the line XVI—XVI shown in FIG. 15;

Figure 1:
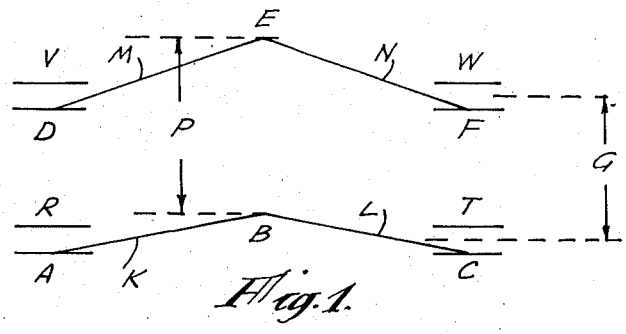
FIG. 1 is a diagram of a lever system deliberately made asymmetrical in a positive sense.
Figure 2:
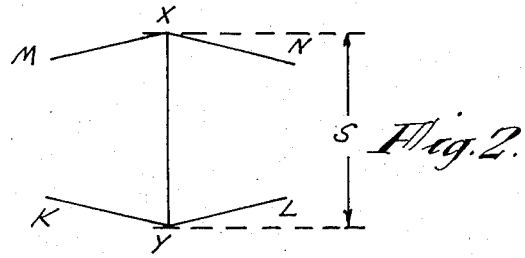
FIG. 2 is a diagram of a spring system for combination with the lever system shown in FIG. 1.

Referring now to FIGS. 1 and 2. This is the first example shown diagrammatically of an asymmetric switch mechanism in which the lever mechanism is deliberately biased in the positive sense by making the distance between the moving contact carrier pivots greater than the contact gap centres.

In the diagram A.C.D.F.R.T.V.W. are the fixed contacts. It is assumed that $AD=VR=FC=WT=G$, the contact gap centre dimension. The moving contact carriers are represented by AB, BC, DE and EF and coil springs are anchored at KL and MN. The moving contact carrier pivot spacing is $EB=P$.

Our first assumption is that P is greater than G by such an amount that ABC becomes a straight line before DEF, under the worst conditions of manufacturing tolerances, when E is moved downwards from the rest position.

The spring system for combination with the lever system of FIG. 1 is shown in FIG. 2. Two coil springs MN and KL are separated by a spacer XY, the length of which equals S which length is greater than P.

Imagine that the two systems shown in FIGS. 1 and 2 are superposed. In combining these two systems the ends of the springs are attached to approximately the centres of the levers respectively, their positions being shown in FIG. 1. It must be appreciated that the springs do not have to be attached to the centres of the levers, the position of attachment depending on the length chosen for the springs. The central attachment position was chosen for convenience of illustrating the invention. When attached to the levers X will be positioned below E and Y below B when the levers are in the position shown in FIG. 1. It must be appreciated that the spacer XY can move independently of the contact carrier EB so that EB moves relatively to the spacer XY. The spring system is of course self-centering and when EB is moved down the spacer XY moves down more slowly. As the point E moves downwards, X must coincide with E before Y coincides with B. Contact pressure is therefore maintained at A and C until X coincides with E. The instant after E passes X the levers DE and EF can change over, since the spring MN can shorten. When the levers DE and EF rise the points M and N must rise and the spring system will immediately rise to centre itself bringing Y past B, whereupon the levers AB and BC will also change over. Provided that the contact gap is such that MK and NL increases far enough to allow Y to rise past B, this mechanism must be bi-stable and deliberately sequential.

Figure 3:
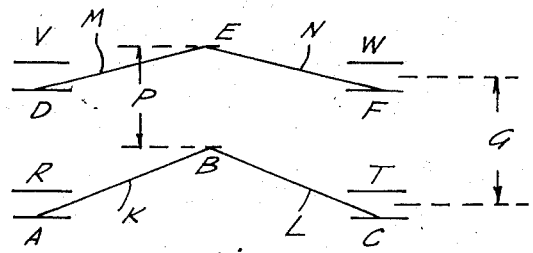
FIG. 3 is a diagram of a lever system deliberately made asymmetrical in the negative sense.
Figure 4:
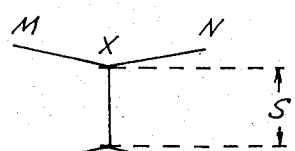
FIG. 4 is a diagram of a spring system for combination with the lever system shown in FIG. 3.

Turning now to FIGS. 3 and 4, the explanation given in connection with FIGS. 1 and 2 applies in reverse, the system being asymmetrical in a negative sense and deliberately sequential. This is brought about by making the pivot centres distance P less than the contact gap centres G. In this case the spacer becomes a link and the relationship becomes such that the link length S must be less than P, which is in turn less than G. In this case the first mechanism to change over will be the levers AB, BC.

Turning now to FIGS. 5 to 19 of the drawings. It is to be appreciated that in order to illustrate clearly the relationship of deliberate positive asymmetry, which this example embodies, the dimensional differences have been deliberately exaggerated so as to be greater than would be used in practice. The amount of such asymmetry is purely a matter of design readily determinable according to the purpose for which the switch is to be used. The switch illustrated comprises a body 2 of moulded synthetic resin having two upstanding rectangular pillars 4 and 5 spaced apart and rising from the base and forming guides for the operating plunger 6 of nylon which is rectangular in cross section and is adapted to project through the aperture 8 formed in the wall 10, said aperture being the same width as the gap between the pillars 4 and 5. The body 2 is further provided at each side with slits 15, 16, 17 and 18 and 15', 16', 17' and 18' respectively for the contacts 19, 20, 21 and 22, and 19', 20', 21' and 22' respectively. Four small projections 30 which rise from the base 31 of the body 2 serve to prevent lateral displacement of the movable contacts to be described hereafter. The body is further provided with mounting holes 32 passing centrally through the pillars 4 and 5. It will be seen that the pillars extend beyond the height of the wall 10 and are designed to locate the lid by entering apertures 40 formed in the lid 42 (FIGS. 9 and 10) which is a dished moulded structure having a top 44 and a surrounding wall 46 which in a manner similar to the base is provided with a slot 48 to permit the passage of the button of the operating plunger 6. The top 44 is also provided on its underside with small projections 50 for preventing lateral movement of the moving contacts.

Turning now to FIGS. 11 and 12, it will be seen that the operating plunger 6 is of rectangular cross section having an extension in the form of an actuating button 60 adapted to project through the aperture 8 in the wall 10 of the body 2. The lateral projections 62 serve as limit stops to limit the upward movement of the operating plunger 6 by engaging the inside of the wall 10. The body of the operating plunger 6 is provided with narrow slots 64 and 66 which intersect wider passages 68 and 70, the slots and passages being at right angles to each other. The slot 66 is open at the bottom. The slots 64 and 66 and the passages 68 and 70 are separated by a centre solid portion 72 which is traversed by a vertical drill hole 74. The slots 64 and 66 are for the reception of moving contact anchors, the passages 68 and 70 are for accommodation of actuating springs for the snap action and the drill hole 74 is for a suitable linkage decribed hereafter. The said anchors, springs and linkage will now be described.

Figure 5:
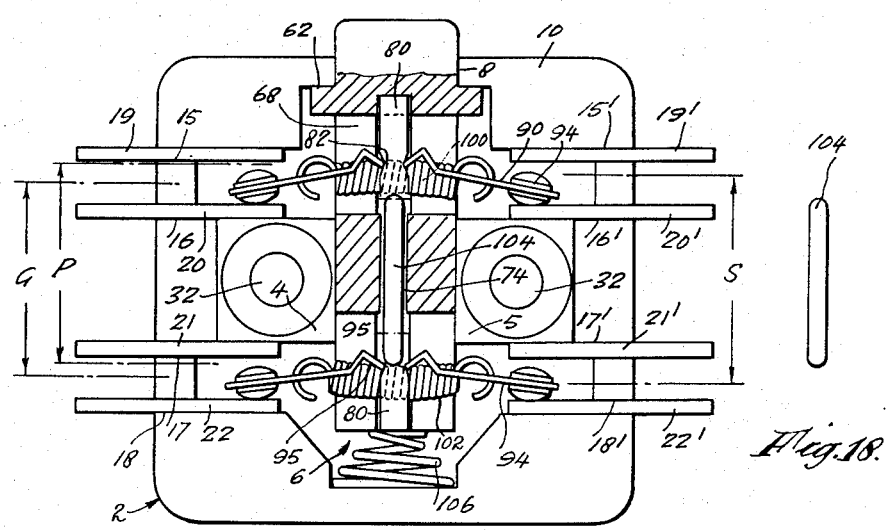
FIG. 5 is a general arrangement plan view partly in section, showing one embodiment of a switch made in accordance with the present invention, the cover having been omitted in order to show the mechanism. This arrangement incorporates deliberate positive asymmetry as illustrated in FIGS. 1 and 2.
Figures 6, 8, 18:
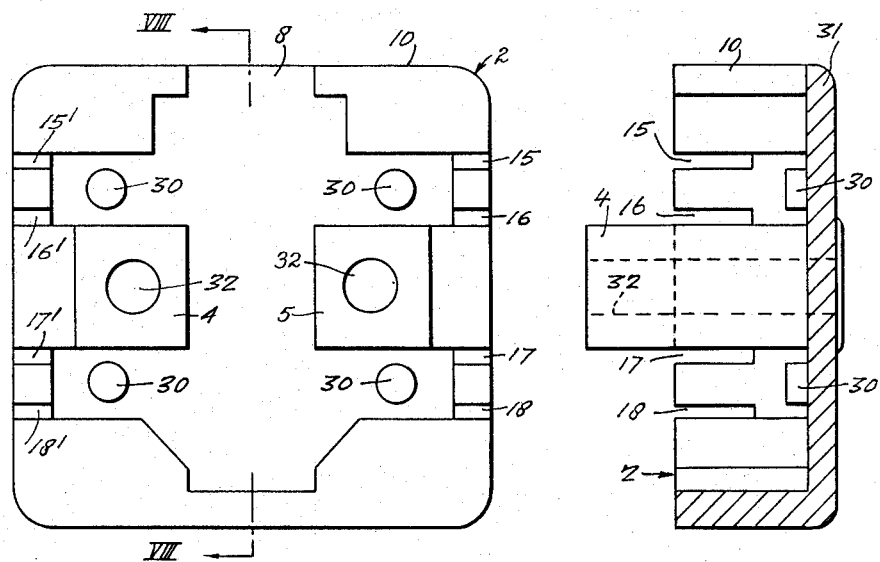
FIG. 6 is a plan view of the body of the switch shown in FIG. 5 and with the mechanism removed.
FIG. 8 is a section on the line VIII—VIII of FIG. 6.
FIG. 18 is a perspective view of the spacing member embodied in the arrangement shown in FIG. 5.

Turning to FIGS. 13 and 14 it will be seen that the anchors 80 of which two are required and shown in FIG. 5 are machined from brass strip on each side of which V-shaped grooves 82 are milled to form pivot points for the ends of moving contacts next to be described. The centre of the anchor is cut away at 84 to clear the springs already mentioned. The operating plunger 6 and the two anchors 80 carried thereby together constitute the actuator member of the switch.

The vertical distance between the grooves $82=P$ is greater than the distance between the faces of the contacts $19,21=20,21=19',21'=20',22'=G$.

In FIGS. 15 and 16 is seen one of the four moving contact carrying arms 90 of flat brass strip, which, as will be seen, carries a contact 94 at one end; the other end is bifurcated to provide legs which are cut off square but bent up out of their plane to form a V at their ends to present a knife edge 95 for engagement with the grooves 82 of the anchors, said knife edges being in line and in the medial plane of the contact carrying arm. Each contact carrying arm is pierced at 98 to receive the end of a coil spring 100 (FIG. 5) the pull of which holds the edges 95 in the grooves 82. It will be seen that the springs 100 and 102 each extend between a pair of moving contacts 90 and provide the snap action of the switch. The switch has a cylindrical glass bar 104 (FIG. 18) constituting a suitable spacer for the positively asymmetric lever system shown, which bar 104, as will be seen from FIG. 5, is located in the drill hole 74 in the operating plunger 6, the lower end of the bar 104 is partly hidden by the lower anchor 80. The bar 104 is of such a length as to hold the axes of the springs 100 and 102 spaced apart a distance S which is greater than the distance P between the V-shaped grooves 82 and exerts a pressure on these springs, holding them apart. Beneath the operating plunger 6 is a return spring 106 of conical form, the top of which also serves to retain the lower anchor 80 in the slot 66 of the operating plunger 6.

The operation of the switch is as follows. As the operating plunger 6 is depressed, the anchors 80 are moved down taking with them the pivot ends 95 of the moving contact arms 90. At the same time the springs 100 and 102 also move down but less slowly, taking with them the glass bar 104. When the axis of the spring 100 comes into line with the notch 82 in the upper anchor the upper moving contacts leave the fixed contacts 20, 20' and move to the fixed contacts 19, 19' with a snap action. This action releases the spring 102, the axis of which rises above the notch 82 in the lower anchor and causes the lower pair of moving contact arms 94 to change over with a snap action from the fixed contacts 22, 22' to the fixed contacts 21, 21'. This position of the moving contact arms is maintained so long as the operating plunger 6 is held down, but when released and allowed to return under the action of the spring 106 the reverse action takes place, the lower pair of contact arms 94 changing over first, closely followed by the upper contact arms 90.

Figure 17:
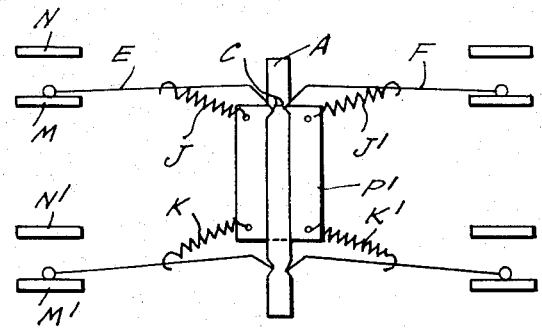
FIG. 17 is a diagrammatic view of another modified form of switch made in accordance with the present invention.

Turning now to FIG. 17. This shows diagrammatically a modified form of switch having deliberate negative asymmetry. The two single springs are replaced by four springs coupled to a plate.

Figure 20:
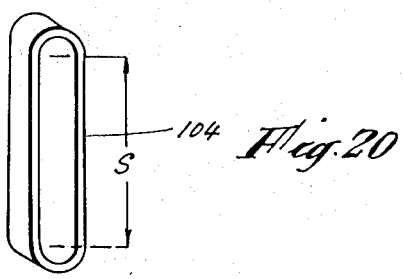
FIG. 20 shows in perspective a modified form of spacing member also on an enlarged scale to be used in a switch embodying negative asymmetry.
Figure 19:
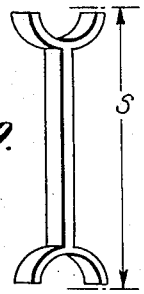
FIG. 19 shows a modified form of spacing member for use in the switch illustrated in FIG. 5 drawn to an enlarged scale.

As regards FIGS. 19 and 20 these are included to show that other forms of spacers may be used according to requirements of design. That shown in FIG. 19 can replace the one shown in FIG. 18 subject to suitable modifications of the anchor member and/or plunger. The spacer member shown in FIG. 20 is one example of a spacer for use with a lever system having deliberate negative asymmetary, for example such as is shown in FIG. 17 if single springs 100, as in FIG. 5, are employed.

Figure 21:
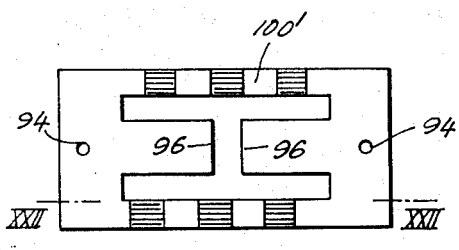
FIG. 21 is a modified form of pivoted contact carrying arms and spring formed as a unitary structure.
Figure 22:
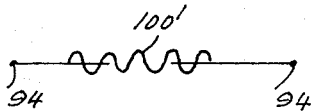
FIG. 22 is a section on the line XXII—XXII of FIG. 21.

Referring now to FIGS 21 and 22, the structure here shown, instead of having two pairs of separate contact carrying arms, as shown in FIG. 5, each connected by a coil spring, is a one piece pressing and consists of two pivoted T-shaped contact carrying arms 90, the arms of the T's being joined by corrugated strips 100', the whole being stamped from springy sheet metal so that when the knife edge ends 95 are engaged in the grooves 82 of an anchor member 8 the corrugated strips 100' are placed under tension and serve exactly the same purpose as the springs 100.

Figure 23:
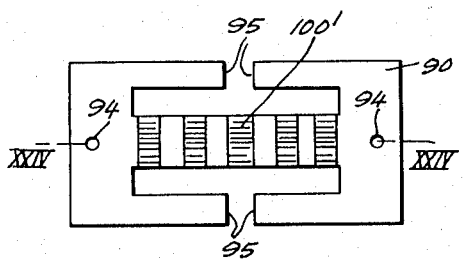
FIG. 23 is a further modified form of pivoted contact carrying arms and spring formed as a unitary structure.
Figure 24:
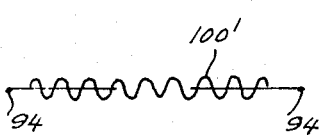
FIG. 24 is a section on the line XXIV—XXIV of FIG. 23.

In like manner the modified arrangement shown in FIGS. 23 and 24 consists of two U-shaped pivoted contact carrying arms 90 joined by a single corrugated spring strip 100'.

What I claim and desire to secure by Letters Patent is:

1. An electric switch comprising two switch mechanisms ganged together for joint operation each mechanism having at least two fixed contacts, the corresponding fixed contacts of said mechanisms being arranged in superposed relation, each switch mechanism having a one pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator differing slightly from the distance between the corresponding superposed fixed contacts, at least one over-center tension member connecting each said pair of opposed movable contact arms and a linking member extending between two corresponding tension members of said two mechanisms and engaging each said tension member at a medial point, said linking member being movable independently and lightly displacing said tension members where linked at said medial point, the distance between said corresponding tension members differing slight at said medial point from the distance between said pivots in the same sense that said pivots are displaced from the distance between the corresponding contacts.

2. An electrical switch comprising two switch mechanisms ganged together for joint operation, each mechanism having at least two fixed contacts, the corresponding fixed contacts of said mechanisms being arranged in superposed relation, each switch mechanism having a pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator differing slightly from the distance between the corresponding superposed fixed contacts, at least one over-center tension member connecting each said pair of opposed movable contact arms and a linking member extending between two corresponding tension members of said two mechanisms and engaging each said tension member at a medial point, said linking member being movable independently of said common actuator and slightly displacing said tension members, the distance between said corresponding tension members differing slightly at said medial point from the distance between said pivots in the same sense that the latter differs from the distance between the corresponding contacts, said linking member being slidably supported and guided in said common actuator.

3. An electric switch comprising two switch mechanisms ganged together for joint operation, each mechanism having at least two fixed contacts, the corresponding fixed contacts of said mechanisms being arranged in superposed relation, each switch mechanism having a pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator differing slightly from the distance between the corresponding superposed fixed contacts, an over-center coil spring tension member connecting each said pair of opposed movable contact arms and a linking member extending between two corresponding tension members for said two mechanisms and engaging each said tension member at a medial point, said linking member being movable independently of said common actuator and lightly displacing said tension member, the distance between said corresponding tension members differing slightly where linked from the distance between said pivots in the same sense that the latter differs from the distance between the corresponding contacts.

4. An electric switch comprising at least two switch mechanisms ganged together for joint operation each mechanism having at least two fixed contacts, the corresponding fixed contacts of said mechanisms being arranged in superposed relation, each switch mechanism having at least one pair of opposed pivotally movable contact arms operatively connected for movement into engagement with and disengagement from said fixed contact, a common actuator for said pivotally movable contact arms engaging said arms at the ends remote from said contacts, the distance between the pivots of said arms in the direction of movement of said common actuator differing slightly from the distance between the corresponding superposed fixed contacts, at least one over-center tension member connecting said opposed movable contact arms and a linking member extending between said tension members for said movable opposed contact arms and engaging each said tension member at a medial point, said linking member being movable independently of said common actuator and lightly displacing said tension members to make the distance between said tension members differ slightly where linked from the distance between said pivots in the same sense that the latter differs from the distance between the corresponding contacts, a return spring being provided and associated with said common actuator for return movement thereof.

5. An electric switch comprising two spaced-apart snap-action mechanisms and a common actuator operatively connecting said snap-action mechanism each of said snap-action mechanisms having a pair of pivotally movable contact arms coupled by coil springs pivoted on said common actuator and a pair of fixed contacts for each contact arm to provide two contact positions for each arm, said common actuator displacing said movable contact arms through an aligned position in one direction, linking means slidably mounted on and movable independently of said common actuator engaging said coil springs intermediate the ends of said springs and urging said springs out of their normal position, the axes of said springs, where linked, being spaced apart a distance which differs slightly from the distance between said pivots on said common actuator in which in turn differs slightly in the same sense from the distance between corresponding fixed contacts of the spaced-apart snap-action mechanisms, and a return spring associated with said common actuator.

6. An electric switch comprising two spaced-apart snap-action mechanisms and a common actuator operatively connecting said snap-action mechanisms each of said snap-action mechanisms having a pair of pivotally movable contact arms carried on said common actuator and coupled by coil springs, a pair of fixed contacts for each contact arm to provide two contact positions for each arm, said common actuator displacing said movable contact arms through an aligned position in one direction, linking means slidably mounted on and movable independently of said common actuator engaging said coil springs intermediate the ends of said springs said linking means being a compression linking member urging said springs slightly apart, the axes of said springs where linked being spaced apart a distance slightly greater than the distance between said pivots on said common actuator which in turn is slightly greater than the distance between correspondingly fixed contacts of said spaced apart snap-action mechanisms and a return spring associated with said common actuator.

7. An electric switch comprising two spaced-apart snap-action mechanisms and a common actuator operatively connecting said snap-action mechanisms each of said snap-action mechanisms having a pair of pivotally movable contact arms carried on said common actuator and coupled by coil springs, a pair of fixed contacts for each contact arm to provide two contact positions for each arm, said common actuator displacing said movable contact arms through an aligned position in one direction, linking means slidably mounted on and movable independently of said common actuator engaging said coil springs intermediate the ends of said springs, said linking means being a tension linking member urging said springs slightly together the axes of said springs, where linked, being spaced apart a distance slightly less than the distance between said pivots on said common actuator which in turn is slightly less than the distance between corresponding fixed contacts of said spaced-apart snap-action mechanisms and a return spring associated with same common actuator.

8. An electric switch comprising two switch mechanisms ganged together for joint operation each mechanism having at least two fixed contacts, the corresponding fixed contacts of said mechanisms being arranged in superposed relation, each switch mechanism having a pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator being slightly greater than the distance between the corresponding fixed contacts, thus providing a positive asymmetrical arrangement irrespective of manufacturing tolerances, at least one over-center tension member connecting each said pair of opposed contact arms and a linking member extending between two corresponding tension members of said mechanisms and engaging each said tension member at a medial point, said linking member being movable independently of said common actuator and lightly urging said tension members apart the distance between said tension members at said medial point slightly greater than the distance between said pivots whereby the leading mechanism of the ganged mechanisms controls and determines the instant of snap action change-over of the two pairs of contact arms.

9. An electric switch comprising two switch mechanisms ganged together for joint operation each mechanism having at least two fixed contacts, the corresponding fixed contacts of said mechanisms being arranged in superposed relation, each switch mechanism having a pair of opposed pivotally movable contact arms operatively connected for movement into engagement with and dis-engagement from said fixed contacts, a common actuator for said pivotally movable contact arms engaging said arms at the ends remote from said contacts, the distance between the corresponding pivots of said arms in the direction of movement of said common actuator being slightly less than the distance between the corresponding fixed contacts, thus providing a negative asymmetrical arrangement irrespective of manufacturing tolerances, at least one over-center tension member connecting each said pair of movable opposed contact arms and, a linking member extending between two corresponding tension members of said two mechanisms and engaging each said tension member at a medial point, said linking member being movable independently of said common actuator and lightly urging said tension members together the distance between said corresponding tension members being slightly less at said medial point than the distance between said pivots whereby the trailing mechanism of the ganged mechanisms controls and determines the instant of snap action change-over of the two pairs of contact arms.

10. An electric switch comprising two switch mechanisms ganged together for joint operation each mechanism having at least two fixed contacts the corresponding fixed contacts of said mechanisms being arranged in superposed relation, each mechanism having a pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator being slightly greater than the distance between the corresponding fixed contacts, thus providing a positive asymmetrical arrangement irrespective of manufacturing tolerances, at least one over-center tension member connecting each said pair of opposed movable contact arms a linking member extending between two corresponding tension members of said mechanisms and engaging each said tension member at a medial point, said linking member being movable independently of said common actuator and lightly urging said tension members apart the distance between said tension members at said medial point being slightly greater than the distance between said pivots, said linking member being slidably supported and guided in said common actuator.

11. An electric switch comprising two switch mechanisms ganged together for joint operation each mechanism having at least two fixed contacts, the corresponding fixed contacts of said mechanisms being arranged in superposed relation, each mechanism having a pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator being slightly less than the distance between the corresponding fixed contacts, thus providing a negative asymmetrical arrangement irrespective of manufacturing tolerances, at least one over-center tension member connecting each said pair of opposed movable contact arms, a linking member extending between two corresponding tension members of said mechanisms and engaging each said tension member at a medial point, said linking member being movable independently of said common actuator and lightly urging said tension members together the distance between said tension members at said medial point being slightly less than the distance between said pivots, said linking member being slidably supported and guided in said common actuator.

12. An electric switch comprising two switch mechanisms ganged together for joint operation each mechanism having at least two fixed contacts the corresponding fixed contacts of said mechanisms being arranged in superposed relation, each mechanism having a pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator being slightly greater than the distance between the corresponding fixed contacts, thus providing a positive asymmetrical arrangement irrespective of manufacturing tolerances, at least one over-center coil spring tension member connecting each said pair of opposed movable contact arms, and a linking member extending between two corresponding tension members of said mechanisms and engaging each said tension member at a medial point, said linking member being movable independently of said common actuator and lightly urging said tension members apart the distance between said tension members at said medial point being slightly greater than the distance between said pivots, said linking member being slidably supported and guided in said common actuator and a return spring associated with said common actuator for return movement thereof.

13. An electric switch comprising two switch mechanisms ganged together for joint operation each mechanism having at least two fixed contacts, the corresponding fixed contacts of said mechanisms being arranged in superposed relation, each mechanism having a pair of opposed pivotally movable contact arms operatively connected for movement into engagement with and disengagement from said fixed contacts, a common actuator for said pivotally movable contact arms engaging said arms at the ends remote from said contacts, the distance between the corresponding pivots of said arms in the direction of movement of said common actuator being slightly less than the distance between the corresponding fixed contacts, thus providing a negative asymmetrical arrangement irrespective of manufacturing tolerances, at least one over-center coil spring tension member connecting each said pair of opposed movable contact arms, and a linking member extending between two corresponding tension members of said mechanisms and engaging each said tension member at a medial point, said linking member being movable independently of said common actuator and lightly urging said tension members together the distance between said tension members at said medial point being slightly less than the distance between said pivots, said linking member being slidably supported and guided in said common actuator, and a return spring associated with said common actuator for return movement thereof.

References Cited in the file of this patent

UNITED STATES PATENTS

| 2,750,463 | Roeser | June 12, 1956 |
| 2,801,310 | Roeser | July 30, 1957 |
| 2,884,503 | Connelly | Apr. 28, 1959 |
| 2,921,160 | Lautzenhiser | Jan. 12, 1960 |

FOREIGN PATENTS

| 1,005,596 | Germany | Apr. 4, 1957 |
| 1,145,380 | France | May 6, 1957 |